United States Patent [19]

Gagneraud

[11] 4,334,930

[45] Jun. 15, 1982

[54] MORTARS FOR THERMAL INSULATING JOINTS

[76] Inventor: Francis Gagneraud, Villa Montmorency, 6, avenue des Tilleuls, F-75016 Paris, France

[21] Appl. No.: 198,252

[22] Filed: Oct. 17, 1980

[30] Foreign Application Priority Data

Oct. 24, 1979 [FR] France .................................. 79 26354

[51] Int. Cl.$^3$ ................................................. C04B 7/02
[52] U.S. Cl. ........................................ 106/97; 106/117
[58] Field of Search ..................................... 106/97, 117

[56] References Cited

U.S. PATENT DOCUMENTS

| | | | |
|---|---|---|---|
| 1,904,909 | 4/1933 | Wasson | 106/97 |
| 2,597,370 | 5/1952 | Pecknan | 106/97 |
| 2,721,805 | 10/1955 | Burke | 106/97 |
| 3,002,843 | 10/1961 | Stocker | 106/117 |
| 3,096,188 | 7/1963 | Maydl | 106/97 |

*Primary Examiner*—James Poer
*Attorney, Agent, or Firm*—Browdy and Neimark

[57] ABSTRACT

Mortars for thermal insulating joints, which contain as aggregates artificial light sands made up of pelleted, pellet slags of granulometry 0–3 mm. Preferably, these slags contain a part of partially ground products containing 10 to 25% of grains of a diameter less than 100 microns. These mortars have an apparent specific gravity between 1,300 and 2,000 kg/m$^3$ and a thermal conductivity of 0.20 to 0.60 W/m°C. They are particularly well suited for making joints during erection of walls of light or cellular concrete blocks or multi-alveolar terra cotta walls.

3 Claims, No Drawings

MORTARS FOR THERMAL INSULATING JOINTS

FIELD OF THE INVENTION

This invention relates to the field of construction and masonry elements and relates more particularly to compositions for making mortars intended for use in thermally insulating joints between construction elements.

BACKGROUND OF THE INVENTION

It is known that in construction, for example, of individual dwellings or buildings, and in all masonry work in general, the bonds between the construction elements, such as plates, panels, squares, etc., are made with mortar for joints, the thickness of these usually being between 1 and 2 cm.

When these construction elements consists, for example, of concrete with a base of natural aggregate whose useful thermal conductivity coefficients "λu" are between 1.15 and 1.75 W/m°C. (watts per meter and per degree C.), the influence of mortar joints with a natural sand base is not appreciable from the heat loss viewpoint, because the coefficient λu of the mortar is on the order of 1.15 W/m°C.

On the other hand, if light concrete blocks are used whose thermal conductivity is clearly lower (λu between 0.2 and 0.5 W/m°C.), the joints of normal mortar make the wall heterogeneous and are the origin of considerable heat bridges and heat losses.

The space occupied by the joints in the construction is far from being negligible. For example, when blocks 50×20×27.5 (cm) are used for making finished walls 30 cm thick, joints of 1 cm or 2 cm represent respectively 6.4% or 12.88% of the total wall surface. Further, heat losses due to the joints are not proportional to the surface; thus it has been determined that for a wall made up of light blocks erected with normal mortar representing about 10% of the total surface, the heat loss due to the joints is on the order of 40% of the total caloric loss.

A technical problem therefore arises at the level of the choice of mortar suitable for joints with good heat insulation and suited to the construction element used.

SUMMARY OF THE INVENTION

To solve this problem of improving heat resistance, for example in the case of walls made of light bricks, it is possible to think, a priori, of using mortars exhibiting thermal conductivities comparable to those of the light concrete making up the blocks. For example, this could lead to using as aggregate for these mortars light sands used in the manufacture of light aggregates.

It has now been found that joints constituting good thermal insulators can be obtained by using as light sand in the mortar composition a pelleted blast furnace slag with a granulometry between 0 and 3 mm.

Such a slag sand comprises a high porportion of hollow spherical globules with closed porosity and makes it possible to obtain, by lowering of the equilibrium moisture of the mortar, a coefficient λu clearly less than that of a standard mortar with a base of siliceous sand or the like.

Actually, reduction of the thermal conductivity coefficient is not due only to the lowering of the equilibrium moisture proceeding from the presence of closed pores in the slag grain according to the invention. The nature of the material making up the sand of pelleted slag plays an important part: a thermal conductivity coefficient λ between 0.8 and 1.2 W/m°C. is ascribed to a compact crystallized blast furnace slag, with a specific gravity of 2,900 kg/m$^3$, as compared with the thermal conductivity coefficient of silica, which is 3.5 W/m°C.

Further, the sands of pelleted slag have a vitreous microstructure caused by a rapid cooling. Now it has been proven that vitreous materials have thermal conductivities lower than crystallized materials of the same origin. This is also true for vitreous slag; thus, compact crystallized slag registering a coefficient λ of 1.2 W/m°C. falls to 0.65 W/m°C. when it is in vitreous form.

DESCRIPTION OF PREFERRED EMBODIMENTS

The pelleted slag sands according to the invention have a set of properties favorable to obtaining mortar having a low thermal conductivity coefficient. In particular:

they contain light grains having small-sized and mostly closed pores, principally for pellet slag;
pelleted blast furnace slag exhibits either a vitreous or vitro-crystalline structure and its thermal resistance is greater than that of compact natural rock.

It will be recalled here that a vitreous slag, which contains practically 100% glass, is obtained by quenching of a molten liquid slag whose temperature is clearly greater than the fusion temperature of the slag; a vitro-crystalline slag is obtained by quenching the molten slag at a temperature equal (or close) to the fusion temperature of the liquid; this slage contains a slight percentage of crystals of microscopic dimensions, on the order of a few microns.

The slags that can be used as light sands according to the invention are products known in themselves. Pelleted slags obtained by using the process according to French Pat. No. 2,303,589 are particularly suitable.

According to an advantageous embodiment, these slags are pre-ground in a rod mill to obtain an average granulometry in the range of 0 to 2 mm and to have a certain amount, for example 10 to 25% by weight, of fines less than 100 microns.

According to another embodiment, there is used a mixture of pelleted slag with a grain diameter of 0 to 3 mm and pre-ground slag with grain diameters of 0 to 2 mm, this latter being able to contain, as indicated above, 10 to 25% of grains (fines) less than 100 microns or even 80 microns.

According to a variant, it is still possible in certain cases, to improve the manageability and facilitate placing the mortars according to the invention by introducing in the mixtures, besides the light aggregates, a small amount, for example 1 to 30%, of a vitrified material made up of microballs with an average diameter between 50 microns and 1 mm, whose shape makes it possible to improve the rheological properties of the mortars. Of such material there can be cited, for example: perlite, fly ash or similar materials.

In practice, the mortars according to the invention can be packaged ready for use, use being by simply mixing with water according to the well known process. The proportions of each of the ingredients (cement, aggregate, various adjuvants) are obviously variable and well defined, depending on the characteristics to be obtained. However, it can be said in a general way that the amount of light sand, according to the invention, of apparent specific gravity on the order of 900 to 1,300 kg/m$^3$, is advantageously between 700 and 1,300 kg per m³ of dry mortar before mixing, the proportion of cement (preferably slag base CPA or CPJ cement) being usually kept between 250 and 500 kg per m³ of dry mortar.

Use of cements as rich as possible in slag content is specified to have a good bond between the hydrated cement matrix and the slag grains, which has a good influence on shrinkage. Further, the thermal conductivity of the matrix is less, which makes it possible to improve the thermal resistance of the slag still more.

The invention is illustrated by the non-limiting embodiments where, unless otherwise noted, the amounts are indicated in mass (weight).

EXAMPLE 1

A mortar is made for thermal insulating joints of the following composition, per m³ of mortar:

| | |
|---|---|
| pelleted slag with a granulometry of 0–3 mm and apparent specific gravity of 1,040 kg/m³ in dry product | 1,000 kg |
| pre-ground pelleted slag, of granulometry of 0–2 mm, of an apparent specific gravity of 1,330 kg/m³ in dry product and containing 10% of fines less than 80 microns | 395 kg |
| slag base CPA or CPJ 45 cement | 425 kg |
| water in the aggregate (the precited slag mixture) | 64 liters |
| mixing water | 203 liters |

The dry apparent specific gravity, measured on samples aged for 90 days and dried in an oven at 120° C. was 1,830 kg/m³. In comparison, this specific gravity was 2,130 kg/m³ for a known mortar made from: 1,646 kg of river sand, 455 kg of CPA 45 cement, 209 liters of mixing water and 69 liters of water in the sand.

The compression strength (Rc) and the tensile strength in bending (Rt) of such a mortar according to the invention were the following as a function of time and expressed in MPa (Megapascals):

| | 1 day | 7 days | 28 days |
|---|---|---|---|
| Rc | 3.5 | 14.7 | 17.9 |
| Rt | 0.94 | 2.67 | 3.44 |

It was possible to improve these characteristics even more by the addition of adjuvants. Thus, by adding an air entrainer at a rate of 0.04% of the cement mass, the compression strength Rc was increased to 34.8 MPa at 7 days, while the tensile strength Rt was established at 4.53 MPa at the end of the same period. On the other hand, however, the specific gravity was increased from 1,830 kg/m³ to 1,960 kg/m³.

The main characteristic of the mortars for joints according to the invention is, of course, their good thermal resistance.

Heat loss measurements on the mortar joints made from this composition showed that for dry material of voluminal mass of 1,830 kg/m³, thermal conductivity coefficient λ was 0.50 W/m°C., which corresponds to a λu of 0.60 W/m°C. for an equilibrium water content of 4%.

By way of comparison, according to the rules Th.K 77 (Nov. 1977) of the DTU (Unified Technical Documents), published by the Centre Scientifique et Technique du Batiment according to record book CSTB No. 1478 of November 1977, a coefficient λu of 1.15 W/m°C. is ascribed to standard joint mortar of specific gravities between 1,800 and 2,100 kg/m³.

EXAMPLE 2

A joint mortar of the same type as that of Example 1 was prepared, but with the following composition:

| | |
|---|---|
| pelleted slag of a granulometry of 0–3 mm and apparent specific gravity of 900 kg/m³ | 858 kg |
| pre-ground pelleted slag of 0–2 mm and of apparent specific gravity of 1,100 kg/m³ | 286 kg |
| slag base cement CPA 45 or CPJ 45 | 350 kg |
| mixing water | 180 liters |

For this mortar of an apparent specific gravity on the order of 1,480 kg/m³ the coefficient λ was 0.30 W/m°C., corresponding to a λu of 0.35 W/m°C. (to be compared with 1.15 W/m°C. according to the standard for a conventional mortar).

In the case of mortars with greater specific gravities, it was possible to determine that coefficients λu varied between 0.45 and 0.60 W/m°C. and were, therefore, two to three times less than the coefficient λu of a conventional joint mortar.

The new mortars according to the invention are especially advantageous during erection of solid hollow-block walls made from concretes containing light sands or aggregates, such as, for example, expanded pelleted slags for a granulometry greater than 3 mm, expanded schists, expanded clay, etc.

In all cases, the surface thermal conductivity coefficients K are clearly reduced for the constructions put up.

This reduction reaches an average of 10 to 20%, which allows walls and/or partitions obtained to be placed under the conditions specified by the precited DTU for climate zones listed in a known way as C and B, in certain cases for zone A, without any insulation having to be provided.

This spectacular improvement of the thermal insulation was also found for walls of multi-alveolar baked earth bricks (known as brick "G") and of cellular concrete blocks of the SIPOREX, DUROX or like types.

As indicated above, the thermal insulating mortars can be made ready for use, either in bulk in case of large construction projects, or by the bag for modest use, as in the construction of individual houses.

It will be obvious to those skilled in the art that various changes may be made without departing from the scope of the invention, and the invention is not considered to be limited to what is described in the specification.

What is claimed is:

1. In a mortar for thermally insulating joints between building or masonry elements, comprising a base of a cementitious binder and fine aggregates or light sand, the improvement wherein said fine aggregates or light sand is a pelleted blast furnace slag having a vitreous or vitrocrystalline microstructure, of granulometry between 0 and 3 mm with spherically shaped grains whose pores are closed for the most part and having an apparent specific gravity, in the dry state, between 1,300 and 2,000 kg/m³ and a thermal conductivity between 0.20 and 0.60 W/m°C.

2. Mortar according to claim 1, wherein said blast furnace slag is made up of a mixture of pelleted slag of granulometry of 0 to 3 mm and partially crushed pelleted slag of granulometry of 0 to 2 mm containing 10 to 25% of fines of a diameter less than 100 microns.

3. Mortar according to claim 1, wherein the proportion of pelleted slag is between 700 and 1,400 kg/m³ of dry mortar and wherein the binder is made up of a CPA or CPJ type cement with a slag base in the proportion of 250 to 500 kg/m³ of dry mortar.

* * * * *